Aug. 20, 1935.　　C. P. BALLENTINE　　2,011,671
VINE CUTTER
Filed May 1, 1935
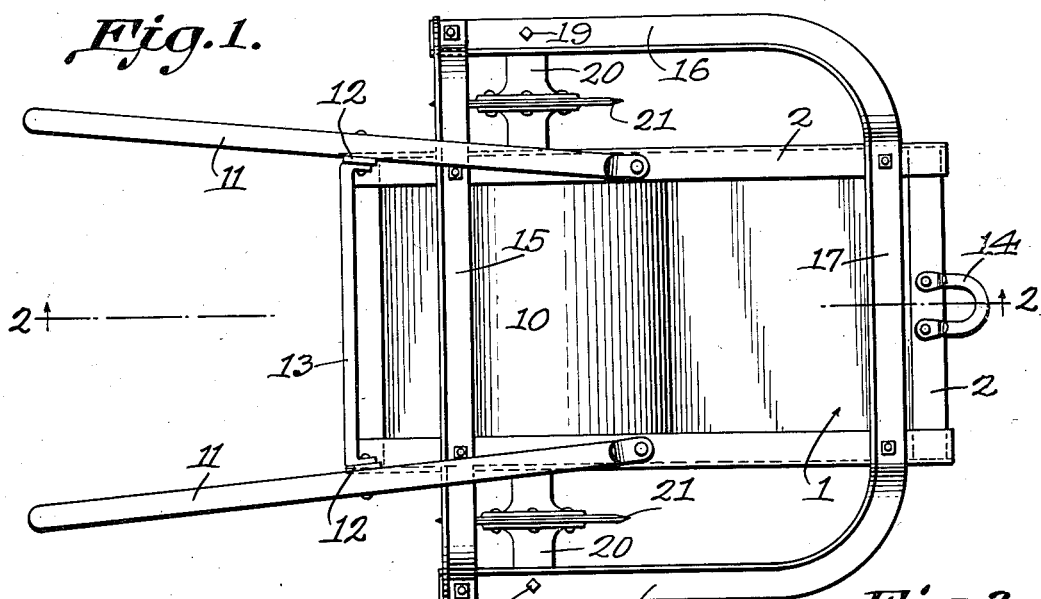
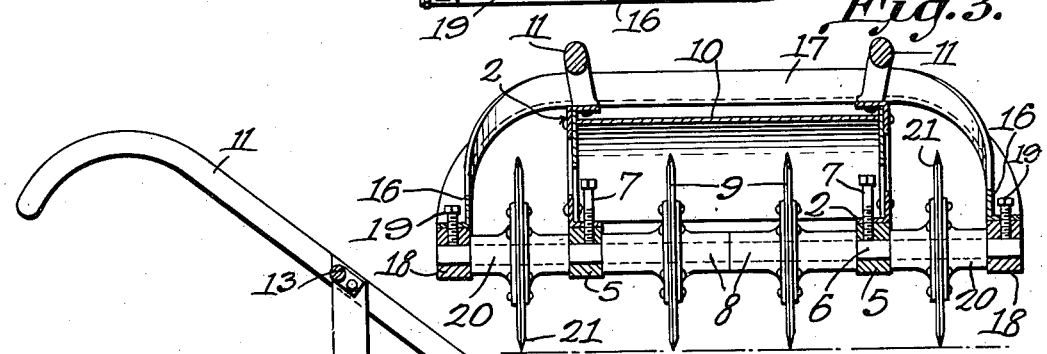
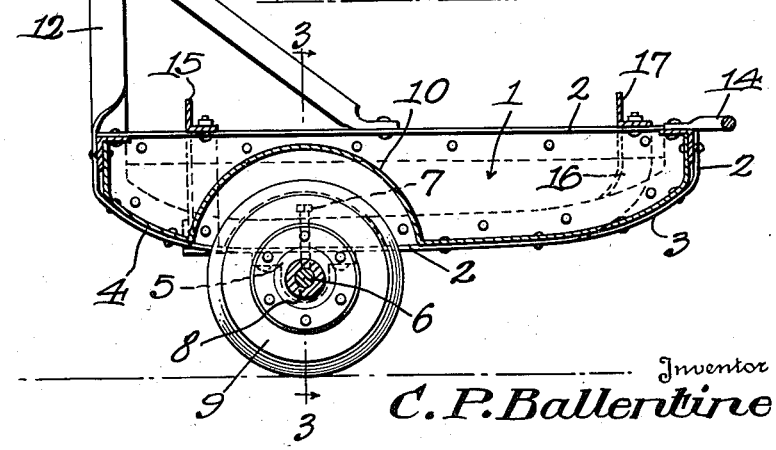
Inventor
C. P. Ballentine
By C. A. Snow & Co.
Attorneys Patented Aug. 20, 1935

2,011,671

UNITED STATES PATENT OFFICE 2,011,671

VINE CUTTER

Charlie P. Ballentine, St. Stephen, S. C.

Application May 1, 1935, Serial No. 19,324

5 Claims. (Cl. 55—64)

This invention relates to a device for cutting sweet potato vines, the vines of velvet beans (*Mucuna utilis*) and other similar vegetation which trails thickly over the surface of the ground in which it is grown.

Heretofore it has been extremely difficult to plow or turn soil covered with vines such as above mentioned because they become so matted as to interfere with the movement of the plow. It has been the practice generally to chop up these vines with hoes prior to using a plow but this procedure has been slow and laborious and consequently expensive.

It is an object of the present invention to provide a simple and efficient device which can be drawn readily over a vine covered field, its supporting means consisting of cutting disks which, during the movement of the device, will sever the vines into short lengths so that a plow or other implement can be used immediately thereafter for turning the soil, digging potatoes, etc., after which the vegetation thus treated can be left covered by the soil so as to act as a fertilizer.

Another object is to provide a device of this character which can be conveniently weighted so as to force the cutting disks the proper distances into the soil, it being possible, by adding to or removing the weighting material, to adapt the device to soils of different densities or degrees of softness.

Another object is to provide an implement of this character which will travel readily over the matted vegetation and at the same time press downwardly any upstanding vegetation which should be brought into the paths of the cutting elements.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a plan view of the device.

Figure 2 is a section on line 2—2 Figure 1.

Figure 3 is a section on line 3—3 Figure 2.

Referring to the figures by characters of reference, 1 designates an elongated box open at the top and formed preferably of sheet metal plates reinforced along their top edges by a frame of angle strips while the sides and ends of the box are similarly reinforced, the several reinforcing strips being indicated at 2 and all being riveted or otherwise joined together and to the walls and bottom of the metal box to form a light but rigid and durable structure.

The bottom of the box is curved downwardly and rearwardly at the front thereof to constitute a deflector 3 and the back end of the bottom is curved upwardly and rearwardly as at 4 so as to also constitute a deflector.

Secured to the bottom side strips 2 preferably back from the longitudinal center of the box are bearings 5 in which is seated an axle 6 held against rotation in any suitable manner, as by means of set screws 7. Mounted for rotation on this axle between the bearings are abutting sleeves 8 to the center portions of which are secured cutting disks 9 constituting supporting wheels for the device. That portion of the bottom of the box above the wheels is arched upwardly as shown at 10 so as to provide clearances for the wheels or disks.

Handles 11 are secured to the side strips 2 at the top of the box and are extended upwardly and rearwardly, these handles being supported by standards 12 and being connected by a cross brace 13.

A coupling loop 14 is attached to the center of the front end of the box and constitutes means whereby a draft animal can be hitched to the device.

The structure as thus far described can be used efficiently for cutting the vines of sweet potatoes immediately prior to the digging operation. Box 1 is loaded with enough dirt, stones or other heavy material to cause the disks 9 thereunder to cut through any vines in the path thereof. The device is then placed over the row of potatoes to be harvested and is pulled forwardly therealong at which time the disks 9 will sever the vines. Consequently a plow can be used readily to uncover the sweet potatoes without being hampered in its movement by the matted vegetation.

Should it be desired to cut up and cover other types of vines such as velvet beans which grow in matted masses on flat surfaces, it is preferred to use with the structure thus far described, an attachment which can easily be placed in position thereon. This attachment includes a cross bar 15 the ends of which are supported beyond the sides of the box 1 and are curved downwardly, their lower ends being bolted or otherwise detachably secured to the rear ends of side arms 16 which are curved downwardly and rearwardly from another cross bar 17 extending across and detachably fastened to the front portion of the box 1. Shaft or axle 6 is of such length as to extend laterally under these arms 16 and bearings 18 are carried by the arms for the reception of the ends of the axle 6 which are secured therein by set screws 19 or the like. Removably mounted on the axle between arms 16 and bearings 5 are sleeves 20 similar to the sleeves 8 and carrying cutting disks 21. Thus when the attachment is used two additional cutters are provided and the device is rendered more efficient as a means for cutting up the vines of velvet beans and similar growths.

When it is desired to use the device solely for cutting the vines of sweet potatoes, the attachment can be removed readily simply by disconnecting the ends of bar 15 from arms 16, detaching both bars from the box, and withdrawing the axle from the bearings 18 and the sleeves 20 from the axle. Thus the device is ready for use along rows of sweet potatoes where only two cutters can be used efficiently.

The deflecting end 3 of the box serves to compress thick mats of vines in the path thereof so that they will be held properly to be cut through by the disks and where the attachment is used the forward downwardly curved portions of arms 16 likewise have a compressing action. Consequently there is no danger of the vines becoming entangled with the sleeves 8 and 20 and wrapping about them.

Should the vine cutter move onto an area of soft soil a portion of the load in the box could be removed. In any case the sleeves 8 and 20 will act as rollers to properly support the structure and permit it to be moved forwardly should the cutting disks sink too deeply into the soil.

What is claimed is:

1. A vine cutter including cutting disks constituting supporting wheels, and a weight carrying box mounted on the wheels, the forward end of the bottom of the box being extended downwardly and rearwardly and constituting means for depressing vines in the paths of the disks.

2. A vine cutter including cutting disks constituting supporting wheels, a weight carrying box mounted on the wheels, the forward end of the bottom of the box being extended downwardly and rearwardly and constituting means for depressing vines in the paths of the disks, a handle extending rearwardly from the box, and means at the front end of the box for engagement by a draft device.

3. A vine cutter including a box having a downwardly and rearwardly extended bottom portion at the front constituting vine depressing means, a transverse axle joined to the box and extending thereunder, and combined cutting disks and supporting wheels mounted for rotation on the axle beneath the box.

4. A vine cutter including a load carrying box having a downwardly and rearwardly extended bottom portion constituting a vine depressing means, an axle carried by and extending transversely of the box beneath the same, sleeves rotatable on the axle and constituting rollers, and combined cutting disks and wheels carried by the sleeve.

5. A vine cutter including a load carrying box constituting a vine depressor, a frame detachably connected to the box and having vine depressing portions beyond the sides of the box, an axle extending transversely of and secured to the box and frame, combined sleeves and rollers rotatable on the axle beneath the box and between the sides of the box and frame, and a combined cutting disk and wheel carried by each sleeve.

CHARLIE P. BALLENTINE.